United States Patent Office 3,785,914
Patented Jan. 15, 1974

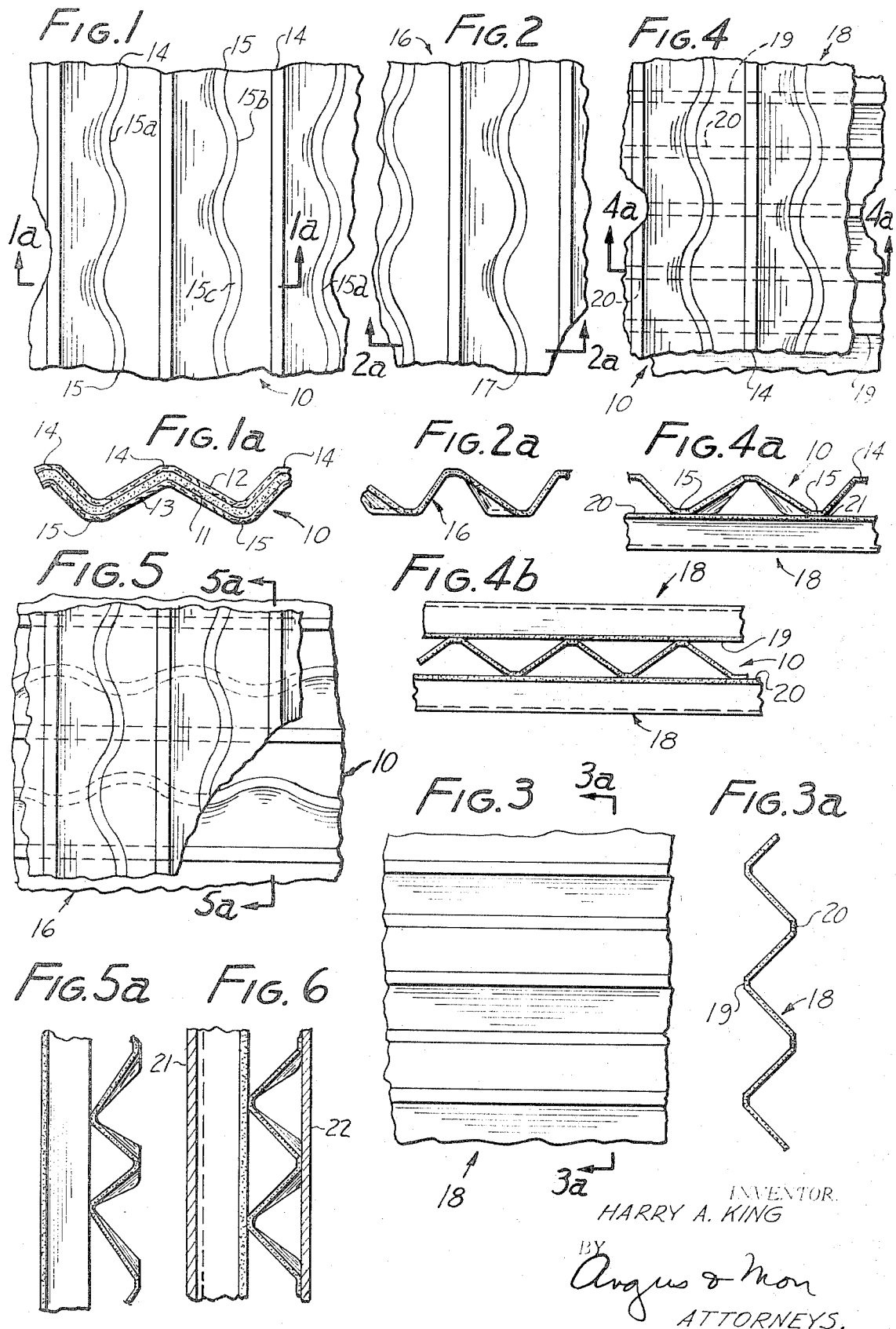

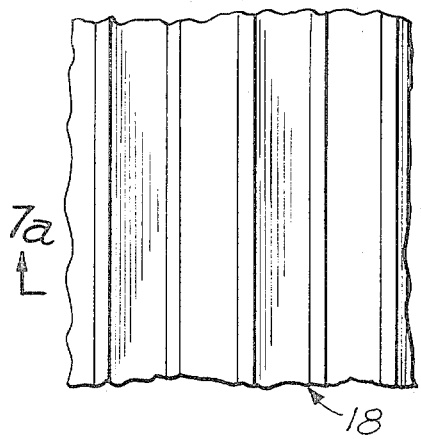
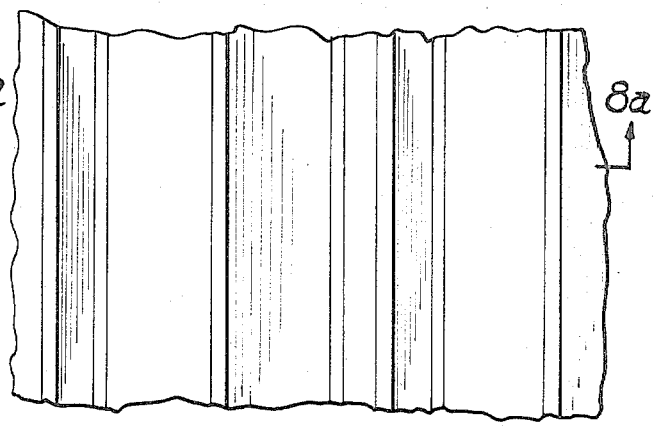
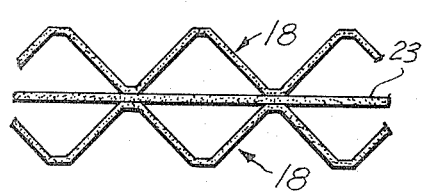
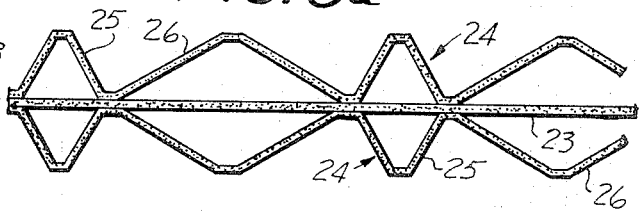
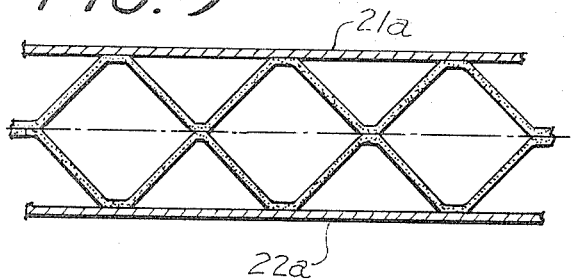

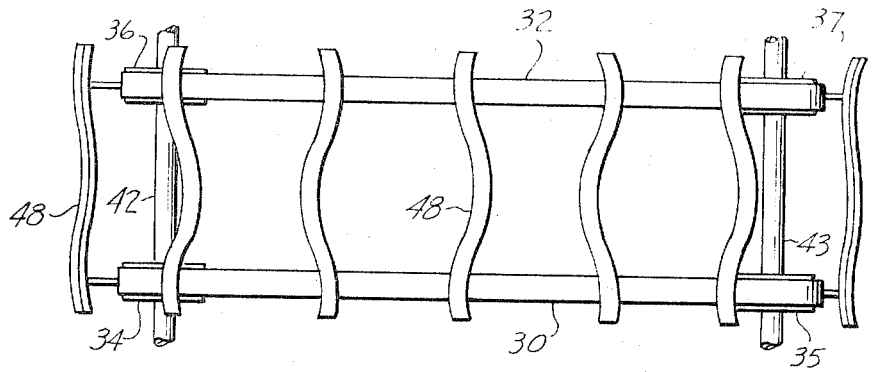
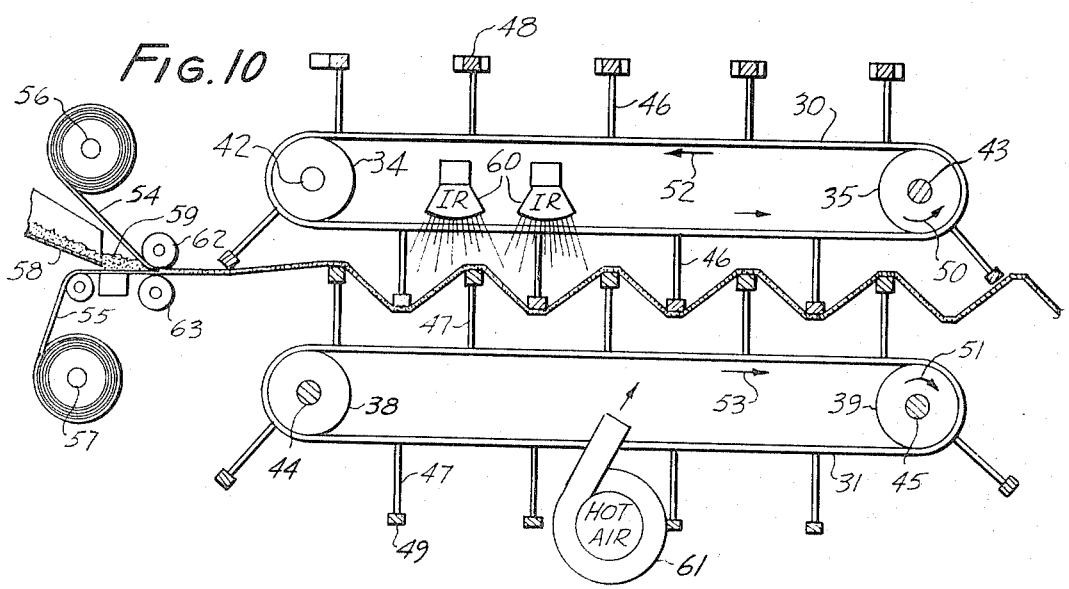
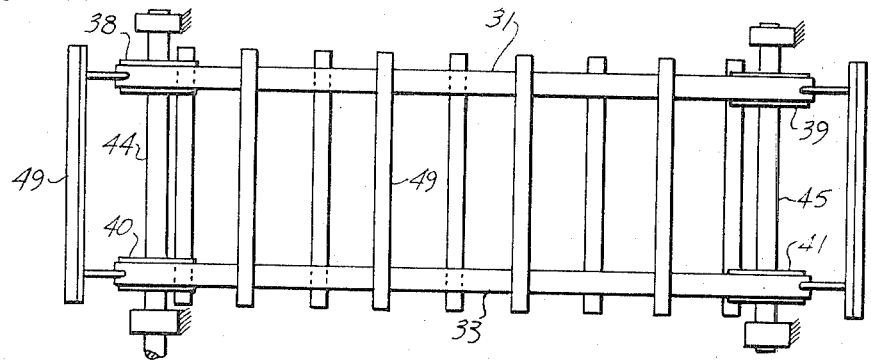

3,785,914
STRUCTURAL MATERIAL AND MEANS AND
METHOD FOR MAKING IT
Harry A. King, 19361 Trino Circle,
Yorba Linda, Calif. 92686
Filed July 8, 1971, Ser. No. 160,738
Int. Cl. B32b 3/28
U.S. Cl. 161—133
16 Claims

ABSTRACT OF THE DISCLOSURE

Sheet material is made from a sandwich of a dried matrix slurry covered on both sides with a layer of fibrous material. This sandwich material is formed into corrugations having flat ridges prior to drying and hardening. The corrugations may take a number of forms including undulating or serpentine forms providing corresponding undulating ridges and also straight ridges. The sandwich sheets can be formed in a mechanism comprising travelling chains carrying arms with bars which form the desired shaped ridges. A structure is made up by over-laying a plurality of such corrugated sheets. Adjacent corrugated sheets are adhered to each other at the flat ridges. Advantages of structures made from this material reside in strength, rigidity, heat and sound insulation.

---

This invention relates to structural material and a method of making the same. More particularly, it relates to a panel or sheet-like building material combining properties of strength, rigidity, fire resistance, and sound and heat insulation.

It is an object of the invention to provide a structural material which has sufficient strength and rigidity that it can be used as a vertical or horizontal wall or ceiling without need for incorporating supporting studs or beams within its surface.

Another object is to produce such a material from basic ingredients which are relatively inexpensive.

Building materials which are fire resistant and heat and sound insulating are known, and laminated or sandwich types are known, and it is known to provide structural material with air spaces within the structure by use of honeycomb or corrugated configurations.

In accordance with the present invention, there is provided a structure which is not only resistant to heat and sound transmission, but also is self-supporting, rigid and of great strength, and moreover is relatively inexpensive. The invention is carried out in one aspect by use of a sandwich type of sheeting comprising a matrix layer between adherent outer fibrous layers which are resistant to chemicals of the matrix. The matrix layer is preferably formed from a mixture of sodium silicate and zinc oxide preferably admixed with an inert low-cost particulate substance, and preferably also with some fibrous material. The fibrous outer layers can also be relatively inexpensive as compared with woven materials and yet provide great strength as used according to this invention.

The sandwich sheeting can be made by placing the matrix in a wet condition between the outer fibrous layers, and causing the matrix to dry. Upon drying, this sandwich or laminated sheet becomes solidly rigid and strong with the fibrous layers securely adhered to the matrix. The sandwich sheeting must be shaped to a desired configuration before the matrix becomes dry and hard.

According to a feature of the invention, such a sheet is formed in a convoluted or corrugated configuration with non-linear, sepentine undulations. Adjacent undulations may be made either parallel or non-parallel to each other depending on kinds of sound impeding effects desired.

According to another feature, straight corrugations are intermingled with undulating or sepentine corrugations.

According to another feature of the invention, a panel structure is formed of a plurality of such corrugated sheets overlying one another with the corrugations of one transverse to those of the other.

A panel may also be formed with corrugated sheets overlying one another with the corrugations parallel to each other and bonded to each other.

Other optional features of the invention reside in shapes of the corrugations and in the corrugations of overlying sheets of a panel structure, thereby to provide for desirable sound deadening effect.

The foregoing and other features of the invention will be better understood from the following detailed description and the accompanying drawings, in which:

FIG. 1 shows a plan view of a laminated sheet according to this invention, and FIG. 1a is a cross-section view taken at line 1a—1a of FIG. 1;

FIG. 2 shows a plan view of another form of laminated sheet according to this invention, and FIG. 2a is a cross-section view taken at line 2a—2a of FIG. 2;

FIG. 3 shows another configuration of a laminated sheet made according to this invention; and FIG. 3a is a cross-section view at line 3a—3a of FIG. 3;

FIG. 4 shows a plan view of a composite panel structure according to this invention, comprising a sheet of configuration like that of FIG. 1 and a sheet of configuration like that of FIG. 3; and FIG. 4a is a cross-section view taken at line 4a—4a of FIG. 4; FIG. 4b is a cross-section view showing a composite panel structure according to this invention;

FIG. 5 shows a plan view of a composite panel structure according to this invention comprising a sheet having the configuration of FIG. 1 and a sheet having the configuration of FIG. 2; FIG. 5a is a cross-section view taken at line 5a—5a of FIG. 5;

FIG. 6 is a cross-section view showing the presence of wall board on each side of a laminated sheet according to this invention;

FIG. 7 is a plan view of another composite arrangement according to the present invention; and FIG. 7a is a cross-section view at line 7a—7a of FIG. 7;

FIG. 8 is a plan view of still another configuration of structure according to the present invention; and FIG. 8a is a cross-section view at lines 8a—8a of FIG. 11;

FIG. 9 is a cross-section view of still another configuration according to the present invention;

FIG. 10 is an elevation view of a mechanism for forming laminated sheet material of the type shown in FIGS. 1 to 9;

FIG. 11 is a top plan view of the machine of FIG. 10; and

FIG. 12 is a bottom view of the machine of FIG. 10.

FIGS. 1 and 1a shows a portion of a laminated sheet 10 having an iner matrix layer 11 and two outer layers 12 and 13 preferably of a fibrous substance. The matrix layer perferably is comprised in large part of a mixture of inert low-cost particulate matter such as sand, ground rock, asbestos fiber, or ground silicate or the like. It is preferably made from a slurry of sodium silicate and finely divided zinc oxide with water, the mixture of which on heating above 200° F., and preferably above 300° F., forms a zinc silicate, and the particulate matter such as the sand or the like is mixed into this slurry as a filler and reinforcement. Upon drying and reaction of the zinc oxide with sodium silicate, the matrix layer 11 becomes very hard, rigid and water resistant. Great strength is added by the outer fiber layers 12 and 13 which can conveniently be applied to the matrix layer 11 while it is still in its wet condition so that the fiber layers are merged and bonded to the matrix layer.

Suitable proportions for the matrix material are as follows: Ten parts N grade sodium silicate and between 2 and 60 parts of the filler material (such as sand, ground rock, or asbestos or mixtures thereof). It is preferred that this filler shall contain approximately one-half percent asbestos. A preferred mixture of the ingredients of the filler is one-half part asbestos, 20 parts sand and 20 parts ground quartz. The zinc oxide should be present in the range of between 4 and 12 parts of the zinc oxide per 100 parts of the sodium silicate, and preferably about 8 parts of the zinc oxide is used per 100 parts of sodium silicate. The N grade sodium silicate is available from Philadelphia Quartz Company, although it is also available elsewhere. All of the above-stated parts and percentages are by weight.

The fibers of the fibrous layers may, in the interest of economy, be non-woven but should be non-reactive to a hot alkaline conditions. Use of cellulose fibers such as cotton, wood or rayon should be avoided as they are destroyed during the period of high temperature required for making the sandwich sheet and therefore do not contribute strength to these sheets. Suitable fibrous materials are those made of polyester fibers, for example that known as Reemay available from E. I. du Pont de Nemours and Co., which is a spun bonded polyester, and also nylon fibers, for example that known as Cerex which is a spun bonded nylon available from Monsanto Chemical Company. Polyester and nylon fibers are not destroyed by hot alkali such as the sodium silicate-zinc oxide mixture.

The sheet 10 is formed into corrugation having ridges in the form of alternate crests 14 and troughs 15, all of the crests 14 being in the same plane and all of the troughs 15 being in another plane spaced from and parallel to, the first mentioned plane, as shown in FIG. 1a. The crests 14 which are in the form of narrow ridges all extending parallel to each other in straight lines equidistant from each other, have a substantial width forming flat outer surfaces lying in the first mentioned plane. The ridges of the troughs 15 also have flat outer surfaces and extend along the regions between the parallel ridges of the nodes, but instead of being in straight lines, they are undulating or serpentine so that at some positions of the sheet a pair of adjacent undulating ridges of the nodes are separated by a maximum distance from each other as between positions 15a and 15b and the next adjacent undulating ridge is at a minimum distance from the immediately preceding undulating ridge, as between positions 15d and 15c. Throughout the lengths of the undulating ridges all the maximum distances are equal to each other.

FIGS. 2 and 2a show a sheet 16 similar to sheet 10 of FIGS. 1 and 1a, the difference from FIG. 1 being that in FIG. 2 adjacent undulating ridges 17 or sheet 16 are equidistant from each other along their length.

In the cross-section view, FIG. 2a, it should be understood that the section although shown as a single material, is intended to represent the sandwich material shown in FIG. 1a, including the central matrix layer 11 and the two fibrous layers 12 and 13 on either side thereof, and this is true of all subsequent sections of the drawings.

FIGS. 3 and 3a show another configuration of sheet 18 in which all of the ridges, both of the crests 19 and the troughs 20 are parallel to each other and equidistant from each other as well as in the same respective separated parallel planes.

FIGS. 4 and 4a illustrate a portion of a composite panel structure made up of a sheet like sheet 10 of FIGS. 1 and 1a and another sheet like sheet 18 of FIGS. 3 and 3a. Sheets 10 and 18 are placed against each other so that the ridges 20 of sheet 18 abut and transversely cross the ridges 15 of sheet number 10, and the contacting flat surfaces of the ridges of the two sheets are made to adhere to each other by a suitable adhesive at their junctions 21.

It is sometimes desirable to build up a composite panel structure of more than two sheets. Such a built-up structure is shown in FIG. 4b which shows a sheet 18 on each side of a sheet 10. It will be recognized that this structure can be built up of any number of sheets 10 alternating with sheets 18 with contacting ridges of adjacent sheets adherent to each other. Such build-up composite structures may be desirable for horizontal placing as for example for ceilings.

FIGS. 5 and 5a show another composite structure in which a sheet 16 of FIG. 2 is placed against a sheet 10 of FIG. 1 with the undulating and straight ridges of the two sheets placed crosswise to each other, and the abutting flats of the respective ridges being adherent to each other by adhesive.

FIG. 6 illustrates a section of a sheet 18 provided at opposite sides with flat facings 21 and 22 such as wallboard, placed against the flats of the ridges, to which they may be cemented. It will be understood that facings such as 21 and 22 may similarly be applied to the outermost ridges of the structures shown in FIGS. 4, 5, and 7 to 9.

The panel structure of FIGS. 7 and 7a comprises a pair of similar sheets 18 of FIG. 3 with a suitable planar web member 23 separating the sheets 18 and arranged so that their adjacent ridges will be juxtaposed to each other on opposite sides of web 23, to which they are cemented. The web member may be rigid or non-rigid.

The panel structure shown in FIGS. 8 and 8a differs from that of FIGS. 7 and 7a in that the sheets 24 at opposite sides of the web 23 have non-uniformly dimensioned corrugations and ridges instead of uniformly spaced and dimensioned corrugations and ridges as in FIG. 7. Thus, in FIGS. 8 and 8a short corrugations 25 alternate with longer corrugations 26 in both sheets, and the sheets are likewise arranged with respective flat ridges juxtaposed to each other.

FIG. 9 shows walls 21a and 22a adhered to outer flats of two sheets 18 of FIG. 3 which are bonded together at their inner flats. No web 23 is used. This arrangement may also be used with the structure of FIGS. 1 and 2.

The corrugated sheets may be used as described above or alternatively they may be further strengthened greatly by applying to their surface a material which can penetrate into the layers of the sheet and when cured or hardened is capable of capturing and transferring stresses without substantial deformation. The loss of moisture during the drying of the sheet can leave voids into which such surface applied material can penetrate. In order to obtain the necessary penetration of such material into the fibrous layers and into the matrix it is applied as a thin liquid. It thereby penetrates into, and fills, voids and permits the original material to maintain its strength as though it had no voids or cracks. A thin penetrating binder for this purpose which will fill any cracks or porosity formed by the drying out of the matrix and will then harden in place forming a non-porous and even stronger material is preferably of phenolic resin because of its low cost, high strength and fire resistance. However, other binders may be used such as epoxy or polyester resins, urea melamine formaldehyde resins and sodium silicate-zinc oxide dispersions.

The low heat transmission characteristics of this product may be further improved by incorporating into this surface coating a heat reflective filler such as aluminum flake or powder or titanium dioxide.

The product may be still further improved by incorporating in the surface coating a sound absorbing material such as ground cork or vermiculite.

The rigid sheets of FIGS. 1 to 9 can conveniently be formed by a suitable machine or mechanism, a simple form of which is shown in FIGS. 9 to 11, which show four endless chains 30, 31, 32 and 33. The two upper chains 30 and 32 are at the same level and are mounted over respective sprocket wheels 34, 35, and 36, 37. Chains 31 and 33 which are at the same level and spaced at some distance below the upper chains 30 and 32, are mounted over sprocket wheels 38, 39 and 40, 41. Sprocket wheels 34 and 36 are fixed to horizontal shaft 42 and spaced apart from each other and sprocket wheels 35 and 37 are fixed to horizontal shaft 43 and spaced apart from each other by the same distance as sprockets 34 and 36 are spaced. Similarly the lower sprocket wheels 38 and 40 are fixed to horizontal shaft 44 and spaced apart from each other by the same spacing as in the case of sprockets 34 and 36, and likewise lower sprocket wheels 39 and 41 are fixed to horizontal shaft 45 and spaced apart from each other by the same distance.

A number of arms 46, all of the same length, are fastened to the respective chains 30 and 32 and extending perpendicularly away from the respective chains, the arms 46 extending upwardly when at the upper reaches of the chains and extending downwardly when at the lower reaches of the chains. Similarly, arms 47, all of the same length, extend from the respective lower chains 31 and 33 and extend perpendicularly thereto and are spaced along the reaches of the respective chains, the arms which extend from the upper reaches of these lower chains extending upwardly from the chains, and those at the lower reaches extending downwardly from the chains. The arms 46 are arranged in pairs, one of each pair being attached to chain 30 and the other of the pair being attached to chain 32, and the arms of each pair are located oppositely to each other. The pairs of arms are spaced equidistant from each other along the lengths of the chains 30 and 32. The arms 47 of the lower chains are similarly arranged in opposite pairs and spaced equidistant along the reaches of the lower chains, the positions of attachment of the arms 47 to their chains being between the positions of the arms 46 of the upper chains.

The outer ends of the arms 46 of the upper chains support bars 48 of an undulating or serpentine shape, each bar being attached to the end of each arm of each respective pair of arms 46. The outer ends of the arms 47 of the lower chains support straight bars 49, each of these being attached to the end of each arm of respective pairs of arms 47.

Suitable means such as a motor or motors (not shown) can be attached to or geared to the respective shafts 43 and 45 in a manner to drive them in the directions of the arrows 50 and 51, which will drive the reaches of the chains in the directions of arrows 52 and 53.

Sheets 54 and 55 of the fibrous material mounted on respective rolls 56 and 57 and supported in a spaced position at one end of the chain mechanism, are led to the machine between the lower reaches of the upper chains and the upper reaches of the lower chains so that they are carried beneath the depending bars 48 and above the upstanding bars 49. A trough 58 delivers matrix slurry 59 from a suitable container (not shown) to the upper side of the lower fibrous strip 55. The desired matrix thickness is obtained by controlling the spacing of rolls 62 and 63 so that the desired thickness of the slurry is sandwiched between the two fibrous strips. The shape of the hopper is such that this delivery spreads the slurry across the width of the strips. This sandwich formed by the slurry between the upper and lower fiber layers is carried forward by action of the bars of the chains. The sandwich material will be shaped in accordance with the shapes and positions of the bars. It will be recognized that the bar shapes shown in FIGS. 9 to 11 will produce a sheet configuration like that of FIG. 1. To produce other sheet configurations the bars will be shaped and positioned accordingly.

Heat from a hot air source such as infrared lamps 60 and/or a blower 61 of hot air directs heat against the travelling sandwich sheet, serving to dry it and solidify the matrix substance, resulting in a sandwich strip of a solid, rigid and strong quality. The sandwich strip is delivered from the machine at the right end of the chains.

The straight ridges such as 14 and 19 of the sheets described herein provide great strength and can serve to supplant the need for studs which are commonly used for strength in a vertical wall. The undulating ridges such as 15 and 19 provide impedance to sound transmission. Owing to the continuously changing dimensions and angles between adjacent undulating ridges, sound waves do not readily travel along the direction of the straight ridges, and there will be sound wave reflections from the undulating portions, creating sound wave interferences and cancellations.

Different kinds of sound-attenuating effects may be provided by selection of dimensions of the ridges including the undulating ridges. For example, the changes of sizes and dimensions of the cavities formed by the ridges and the undulating ridges can serve to produce particularly good attenuations for certain frequencies, and other dimensions can produce especially good attenuating effects for other frequencies. Thus, if a structure is to be placed in a region subject to undesirable sounds within certain frequency ranges, the dimensions of the structure can be selected accordingly.

In the case of composite panel structures such as FIGS. 4 and 5, their sound-deadening effect becomes even greater.

The many air spaces provided by the corrugations and undulations not only inhibit sound transmission through the structure but also act as an inhibitor of heat transmission which will be in addition to the inherent heat-insulating properties of the sandwich material itself.

It will be recognized that it is easy to run wiring, conduits, piping and the like along the straight ridges within a wall formed by this material.

What is claimed is:

1. Rigid, solid, folded, structural sheet material comprising a sandwich having a matrix layer covered on each side thereof by a layer of fibrous substance bonded to the matrix, said matrix comprising a dried slurry containing the reaction product of sodium silicate and zinc oxide with a filler of particulate matter.

2. Material according to claim 1 which is of a corrugated form having crests and troughs forming ridges with flat areas adapted to be adhered to other surfaces.

3. Sheet material according to claim 1 having a corrugated form having crests and troughs forming ridges with flat areas adapted to be adhered to other surfaces, at least some of the ridges being undulating in form.

4. Material according to claim 3 in which the undulations of adjacent undulating ridges are maintained at a constant distance apart.

5. Material according to claim 3 in which the indulations of adjacent undulating ridges are at progressively changing distances apart.

6. Material according to claim 3 in which the undulations of adjacent undulating ridges progressively alternate between a maximum distance and a minimum distance apart.

7. Material according to claim 3 in which some of the ridges are straight.

8. Material according to claim 7 in which the straight and undulating ridges alternate with each other.

9. Material according to claim 1 in which the filler of the matrix contains fibrous substance.

10. Material according to claim 9 in which comminuted matter selected from the group consisting of sand, rock, ground silicates, silicates, low clays and asbestos fibers, and mixtures thereof, is mixed into the matrix.

11. Material according to claim 1 in which a penetrating hardening coating is applied to fill in voids and strengthen the material.

12. Material according to claim 11 in which heat reflective fillers are included in the hardening coating.

13. Material according to claim 11 in which a sound absorbing filler is included in the hardening coating.

14. A structural panel comprising a first rigid corrugated sheet material according to claim 1 having crests and troughs forming ridges provided with flat areas, and a second rigid corrugated sheet material according to claim 1 having crests and troughs forming ridges with flat areas, adhered to the flat areas of the first sheet material, the first sheet material containing ridges which are undulating.

15. A structural panel according to claim 14 in which the ridges of the second sheet are also undulating.

16. A structural panel according to claim 14 in which the ridges of the second sheet are straight.

References Cited

UNITED STATES PATENTS

| | | | |
|---|---|---|---|
| 2,423,870 | 7/1947 | Blessing | 156—208 X |
| 2,858,247 | 10/1958 | De Swart | 161—131 |
| 1,772,686 | 8/1930 | Rahr | 161—135 X |
| 2,454,719 | 11/1948 | Scogland | 156—210 X |
| 2,426,058 | 8/1947 | Scogland | 161—136 X |
| 520,366 | 5/1894 | Leaver | 161—136 |
| 3,356,555 | 12/1967 | Jackson | 156—205 |
| 2,406,815 | 9/1946 | Elfving | 161—136 |
| 2,192,516 | 3/1940 | Cunnington | 161—137 X |
| 1,184,749 | 5/1916 | Hicks | 161—135 |
| 1,855,161 | 4/1932 | Wyman | 161—135 |
| 2,608,500 | 8/1952 | Del Mar et al. | 161—68 |
| 624,828 | 5/1899 | Lantzke | 161—136 |

WILLIAM A. POWELL, Primary Examiner

U.S. Cl. X.R.

156—206, 210, 462; 161—135, 136, 137, 162

O-2237

UNITED STATES PATENT OFFICE
CERTIFICATE OF CORRECTION

Patent No. 3,785,914                           Dated January 15, 1974

Inventor(s)  HARRY A. KING

It is certified that error appears in the above-identified patent and that said Letters Patent are hereby corrected as shown below:

Column 2, line 56    "perferably" should be --preferably--

Column 3, line 16    "conditions" should be --condition--

Column 3, line 29    "corrugation" should be --corrugations--

Column 5, line 3     "other" should be --other,--

Column 5, line 13    "extending" should be --extend--

Claim 5, line 1      "indulations" should be --undulations--

Signed and sealed this 29th day of October 1974.

(SEAL)
Attest:

McCOY M. GIBSON JR.                    C. MARSHALL DANN
Attesting Officer                      Commissioner of Patents